Dec. 31, 1946.  W. WILLMAN  2,413,344
SKIRTED FISH LURE
Filed Oct. 18, 1944
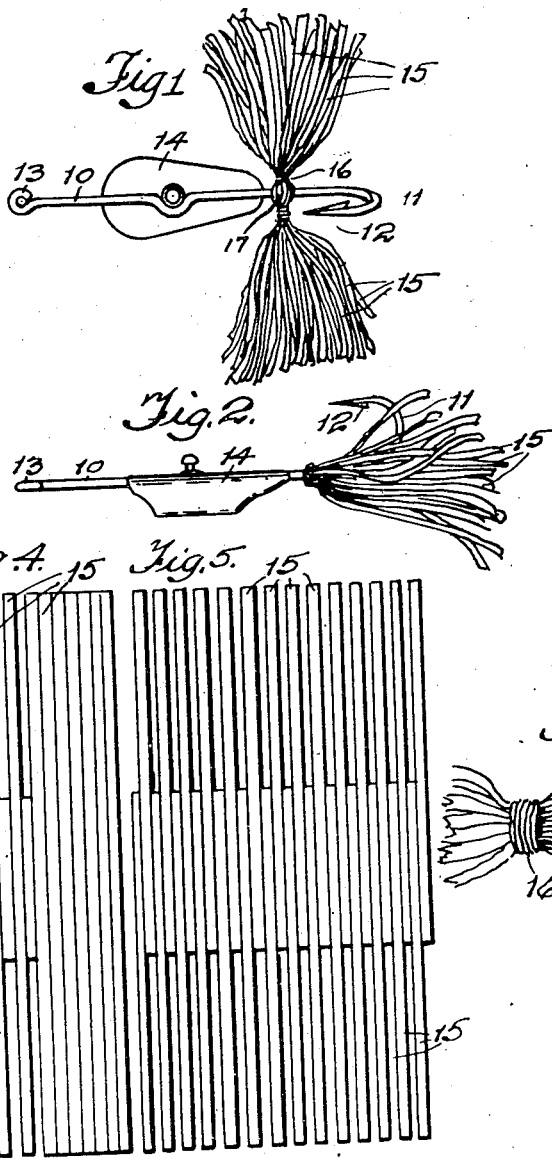
Inventor
Walter Willman
By Banning & Banning
Attorneys.

Patented Dec. 31, 1946

2,413,344

UNITED STATES PATENT OFFICE 2,413,344

SKIRTED FISH LURE

Walter Willman, St. Petersburg, Fla., assignor to James Heddon's Sons, Dowagiac, Mich., a corporation of Michigan Application October 18, 1944, Serial No. 559,170

6 Claims. (Cl. 43—48)

1

The present invention is directed to a fish bait whereon is affixed a skirt formed of thin strips of flexible rubber or equivalent material which, when the lure is trailed through the water will obscure the recurved barbed end of the hook. Such a skirt will also serve in large measure as a weed guard, and by the fluttering action of the strips composing the skirt will give an animated appearance to the lure, thus improving its attractiveness for gamefishes.

The skirt is composed of a multiplicity of strips which are bundled together and bound by windings at separated points near the middle which provides a compacted center body. Through this body may be inserted means whereby to fasten the skirt to a bait—either to its body or to a hook which is associated therewith. As herein shown, the barbed end of the hook may be thrust through the compacted body of the skirt, permitting the latter then to be adjusted to the desired position on the shank of the hook. The compacting of the body portion, and the elasticity of the material affords sufficient friction to retain the skirt at any desired position of adjustment upon the shank without danger of slipping or displacement when in use, and the general construction is one which permits the skirt to be cheaply manufactured and easily applied and adjusted.

Further objects and details will appear from a description of the invention in conjunction with the accompanying drawing wherein:

Figure 1 is a top plan view of the skirt of the present invention applied to a hook of conventional type;

Fig. 2 is a side elevation of the same showing the skirt in the trailing relation assumed while the lure is being retrieved;

Fig. 3 is an enlarged cross-sectional view of the hook shank with the body portion of the hook applied thereto;

Fig. 4 is a view of the strips from which the skirt is composed prior to their assembly into skirted relation, and with the ends terminating in flush relationship; and Fig. 5 is a similar view in which the inner ends of the strips are overlapped in staggered relation to afford sufficient bulk of material at the center of the group.

The skirt is designed for application to a bait body or to the shank of one of its hooks, multiple or otherwise. By way of example, the drawing shows the skirt as carried upon a hook comprising a shank 10 having a recurved hooked end 11 terminating in a barb 12 the forward end of the shank being formed into the usual eye 13. As

2 shown, the hook is provided with a weighted body 14, but it will, of course, be understood that the skirt may be applied to various types of hooks other than the one here shown for purposes of illustration.

The skirt consists of a multiplicity of thin strips 15 which are preferably formed of rubber or other flexible elastic material and the strips are bundled together and secured on each side of the center by windings or similar binding means 16 which closely compact the strips at these points, leaving an intermediate closely compacted body 17 through which the hook can be entered by the application of moderate force after which the body will be pushed along the shank to the desired position.

If desired, in order to increase the bulk of the body, a plurality of short center strips 18 may be combined with the longer strips 15 in which case the windings 16 will engage both the long and short strips. It will also be understood that although in Fig. 4 I have shown the strips 15 as of equal length and with their ends in substantially flush relation to one another, it is contemplated that the strips may, if desired, be of varying length or with their ends in overlapping relation as in Fig. 5 provided only that a sufficient number of strips are overlapped at or near the center of the group to provide the required bulk of material to afford a compacted body of substantial size to receive and cling to the shank of the hook.

The body, being closely compaced and elastic, will yield sufficiently to permit adjustment, but will engage snugly against the shank so that it will not easily be displaced. The free ends of the strips on either side of the windings will spread out or diverge into skirt formation so that when the lure is retrieved, they will trail along the sides of the hook and flutter thereby imparting a lifelike appearance to the lure.

Although it is preferred to form the strips from a thin sheet of elastic rubber, the use of substitutes therefor is contemplated so long as the material selected is of a rubberlike nature which possesses a moderate degree of flexibility and preferably is sufficiently elastic to impinge tightly against the shank of the hook to prevent displacement. It will be understood, however, that fairly good results may be obtained from the use of sheet material, hairs, feathers, or the like having but a slight degree of elasticity, provided the body portion is sufficiently compacted to maintain the skirt upon the hook shank without displacement under ordinary conditions of use.

I claim:

1. In a fish lure the combination of a hook having a shank terminating in a recurved barbed end and a skirt formed of a multiplicity of thin strips of material having a greater number of contiguous portions at the center than at the ends of the group and bundled together near the center of the group and secured at separated points by binding means to provide a compact body having the hook shank entered transversely therethrough and frictionally engaged by the impingement of the compacted material, the free ends of the skirt diverging from one another.

2. In a fish lure the combination of a hook having a shank terminating in a recurved barbed end and a skirt formed of a multiplicity of thin strips of flexible elastic material having a greater number of contiguous portions at the center than at the ends of the group and bundled together near the center of the group and secured at separated points by binding means to provide a compact body having the hook shank enter transversely therethrough and frictionally engaged by the impingement of the compacted elastic material, the free ends of the skirt diverging from one another.

3. For attachment to a fish lure having a hook, a skirt composed of a multiplicity of flexible strips bundled together near the centers thereof, separated binding means for tying together the flexible strips near their centers whereby to provide thereat a compacted body, and means entered between the binding means and through the compacted body between the secured strips for attaching the skirt to the lure with the strip ends free to partially obscure the hook.

4. In a fish lure, a hook having a shank terminating in a recurved barbed end and a skirt composed of a multiplicity of strips bundled together near the centers thereof, separated binding means for tying together the strips near their centers whereby to provide thereat a compactd body, the hook shank being entered between the binding means and transversely through the compacted body at the centers of the strips.

5. In a fish lure, a hook having a shank terminating in a recurved barbed end and a skirt composed of a multiplicity of strips bundled together near the centers thereof, separated binding means for tying together the strips near their centers whereby to provide thereat a compactd body, the hook shank being entered between the binding means and transversely through the compacted body at the centers of the strips, said strips being formed of flexible material and adapted to diverge from one another beyond the binding means on either side of the hook shank.

6. In a fish lure, a hook having a shank terminating in a recurved barbed end and a skirt composed of a multiplicity of strips bundled together near the centers thereof, separated binding means for tying together the strips near their centers whereby to provide thereat a compacted body, the hook shank being entered between the binding means and transversely through the compacted body at the centers of the strips, said strips being formed of flexible elastic material and adapted to diverge from one another beyond the binding means on either side of the hook shank.

WALTER WILLMAN.